(12) United States Patent
Green

(10) Patent No.: US 10,605,395 B1
(45) Date of Patent: Mar. 31, 2020

(54) COLLAPSIBLE PLUG FOR DOWNSPOUTS

(71) Applicant: Robert Dallas Green, Lakewood, CO (US)

(72) Inventor: Robert Dallas Green, Lakewood, CO (US)

(*) Notice: Subject to any disclaimer, the term of this patent is extended or adjusted under 35 U.S.C. 154(b) by 44 days.

(21) Appl. No.: 16/149,767

(22) Filed: Oct. 2, 2018

(51) Int. Cl.
*F16L 55/11* (2006.01)
*E04D 13/08* (2006.01)

(52) U.S. Cl.
CPC .............. *F16L 55/11* (2013.01); *E04D 13/08* (2013.01)

(58) Field of Classification Search
CPC .................................. F16L 55/11; E04D 13/08
USPC ............. 138/89; 137/357; 220/254.1, 254.3, 220/254.7, 259.1, 212, 780, 801, 796; 215/362, 358, 355, 228; 229/125.09, 229/125.08, 114
See application file for complete search history.

(56) References Cited

U.S. PATENT DOCUMENTS

| | | | | |
|---|---|---|---|---|
| 4,285,812 A | * | 8/1981 | Stoltz | E03F 1/00 210/162 |
| 5,409,602 A | * | 4/1995 | Sorenson | B01D 35/02 210/162 |
| 5,546,991 A | * | 8/1996 | Mathison | F16K 7/10 138/89 |
| 6,032,697 A | * | 3/2000 | Kennedy | E03C 1/122 138/110 |
| D451,385 S | * | 12/2001 | Bryan | D9/423 |
| 7,544,288 B1 | * | 6/2009 | Cook | E04D 13/0767 210/150 |
| 9,321,551 B2 | * | 4/2016 | Lu | B65D 3/06 |
| D786,411 S | * | 5/2017 | Kerr | D23/268 |
| 9,926,099 B2 | * | 3/2018 | Kiefer | B65D 5/10 |
| 2007/0017964 A1 | * | 1/2007 | Kamolsuwan | B65D 5/2047 229/155 |
| 2007/0170231 A1 | * | 7/2007 | DeVine | B65D 5/4608 229/117.13 |
| 2012/0110959 A1 | * | 5/2012 | Serago, Jr. | B65B 67/1205 53/467 |
| 2014/0261831 A1 | * | 9/2014 | Nolfi | F16L 55/105 138/89 |

* cited by examiner

*Primary Examiner* — Craig M Schneider
*Assistant Examiner* — David R Deal
(74) *Attorney, Agent, or Firm* — Ramon L. Pizzarro; Edwin H. Crabtree

(57) ABSTRACT

A one-piece shield for temporarily covering the upper inlet of a downspout. The shield includes a single sheet of resilient material, with a pair of tabs that cooperate with a slot in the sheet. The sheet is rolled up to create a tubular portion. One of the tabs is turned into the tubular portion to block the passage into the tubular portion, and the other tab cooperates with the slot to keep the device rolled up, so that the tubular portion blocks entry of debris into the downspout. The device is unrolled after use, and stored flat.

1 Claim, 2 Drawing Sheets

COLLAPSIBLE PLUG FOR DOWNSPOUTS

REFERENCE TO RELATED APPLICATIONS

This application claims the benefit of my U.S. provisional application titled COLLAPSIBLE PLUG FOR DOWNSPOUTS, having Ser. No. 62/393,011, filed Sep. 10, 2016.

BACKGROUND OF THE INVENTION (a) Field of the Invention

This application relates to a system and method for preventing entry of debris into rain gutter downspouts while installing roofs on at a residence or commercial building that has downspouts. More particularly, but not by way of limitation, to a collapsible, temporary, device that creates a highly visible plug in the inlet of the downspout in order to prevent roofing materials being removed from clogging the downspouts while the roof is being replaced.

(b) Discussion of Known Art

There are many known devices that are used to keep leaves and similar debris from entering rain gutters, so that this debris does not reach the downspout. Also, there are screens and other accessible traps for collecting materials that have entered the downspout. However, these types of devices are positioned along the downspout, typically at a location near ground level, so that the debris can be removed without having to climb up to the rain gutters. Also, blocking the entrance of the downspout at its junction with the rain gutters will create a clogging problem that requires someone to climb to the rain gutter to clear the collected debris.

Therefore, a review of known devices reveals that there remains a need for a simple device that blocks material, particularly waste roofing material, from entering downspout while removing or installing roofing systems.

SUMMARY

It has been discovered that the problems left unanswered by known art can be solved by providing a collapsible plug that is formed from a sheet of flexible material, such as 1/32" plastic sheeting, and includes:

A flexible generally rectangular body having a lower section having a lower edge, a pair of side edges that extend up from the lower edge, an upper section having a right tab, a left tab, and a closure tab that is positioned between the right tab and the left tab. The right tab having a hooked section including an engagement slot, and the left tab having an engagement edge, so that rolling the rectangular body about an axis that is generally perpendicular to the lower edge and around the closure tab allows the engagement slot of the right tab to engage the body at a location immediately next to the left tab, so that the hooked section of the right tab cooperates with the engagement edge of the left tab to keep the device from unrolling, while at the same time securing the closure tab within the rolled up rectangular body.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
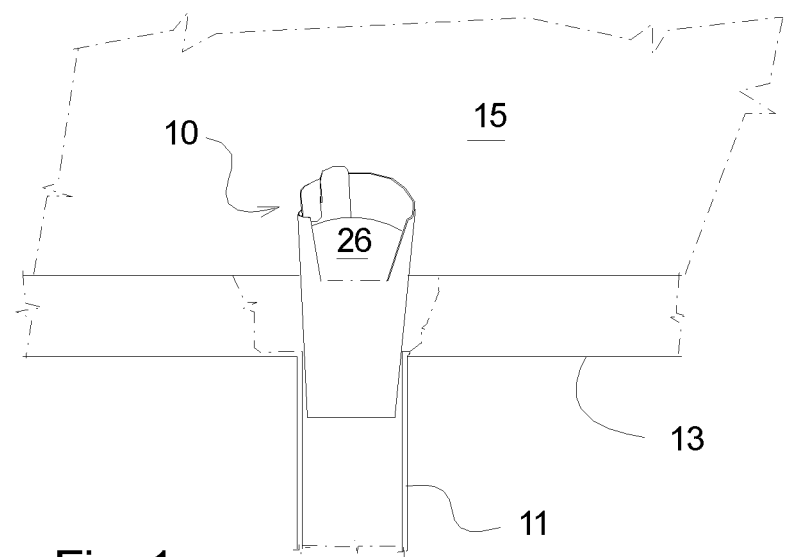
FIG. 1 is a perspective view of an embodiment of the invention shown while in use to plug the entrance of a downspout.
Figure 2:
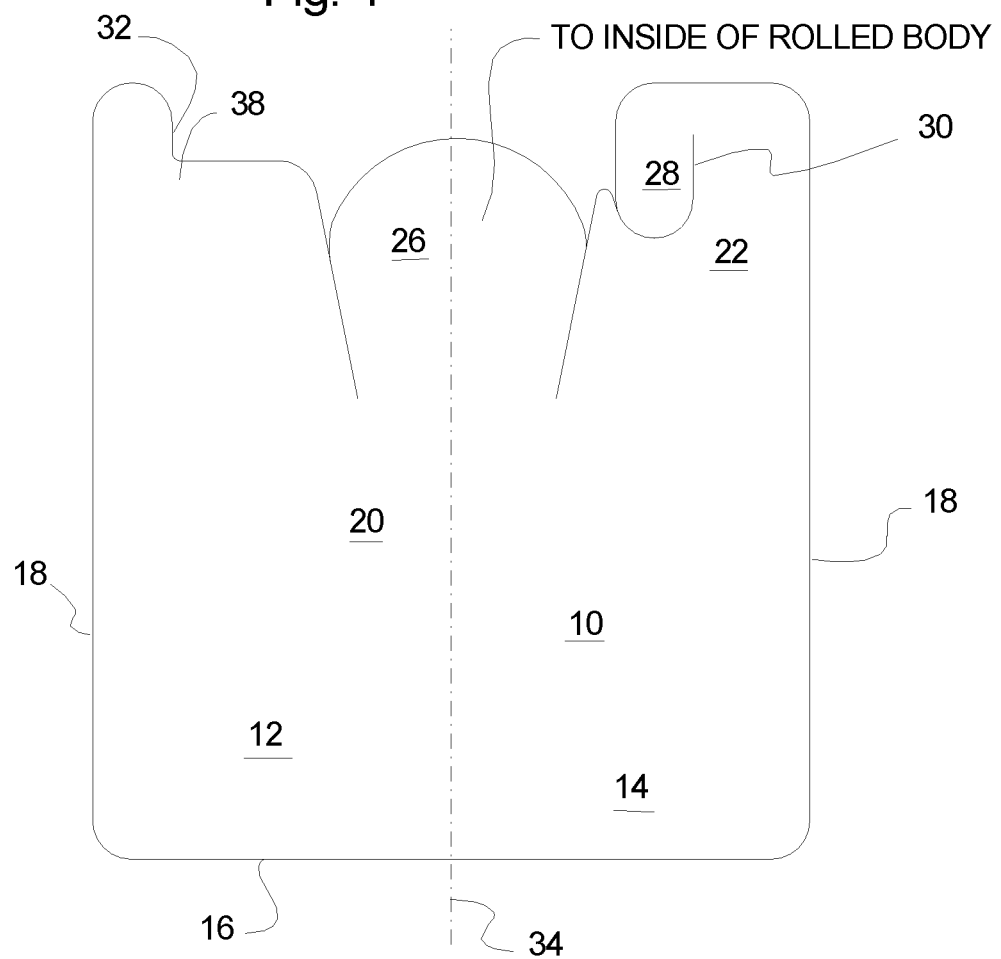
FIG. 2 is a plan view of a preferred example of the invention while lying flat.
Figure 3:
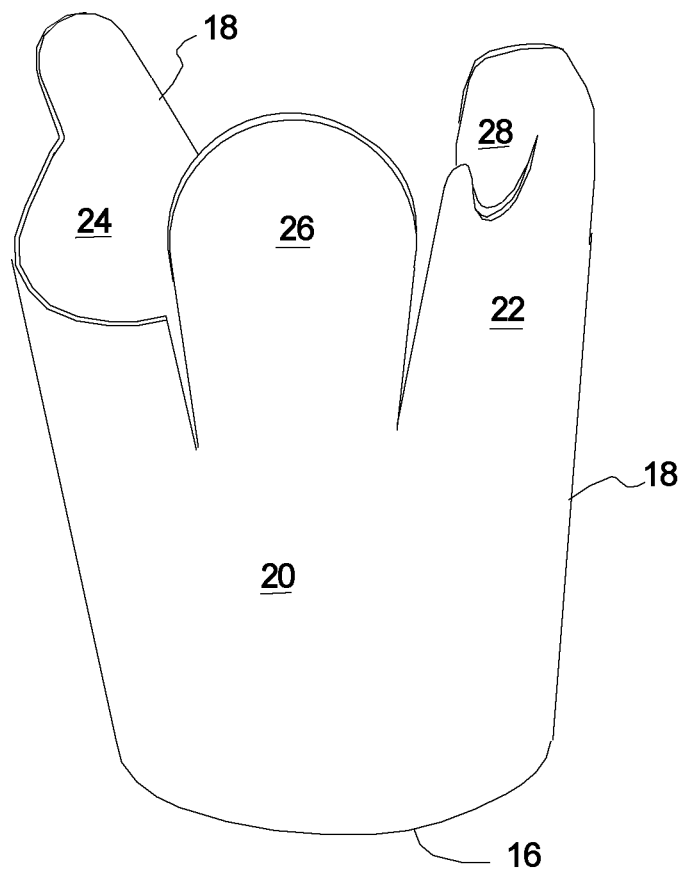
FIG. 3 is perspective view of the disclosed invention as it is being rolled up, before inserting into a downspout.

Turning now to FIG. 1 where the disclosed plugging device 10 for temporarily plugging the inlet of a downspout 11 attached to a gutter 13 attached to roof 15 that is undergoing installation of shingles or other roofing materials. In FIG. 2, the disclosed invention 10 has been shown as having a generally rectangular body 12, illustrated while lying flat. It is preferred that the plugging device 10 be made of a resilient sheet of plastic, such as 1/32" thick sheeting. The resiliency of the sheeting with enhance the cooperation of the components, so as to retain the rolled-up configuration and so as to allow the device to bias itself against the walls of the downspout, and be reused after a re-roofing project is completed.

It is also contemplated that the sheeting be of a highly visible color, such as red, or fluorescent orange or yellow. FIG. 1 also shows that the rectangular body 12 will preferably include a lower section 14 having a lower edge 16, a pair of side edges 18 that extend up from the lower edge 16. Additionally, the rectangular body 12 will have an upper section 20 with a right tab 22, a left tab 24, and a closure tab 26 that is positioned between the right tab 22 and the left tab 24.

Figure 4:
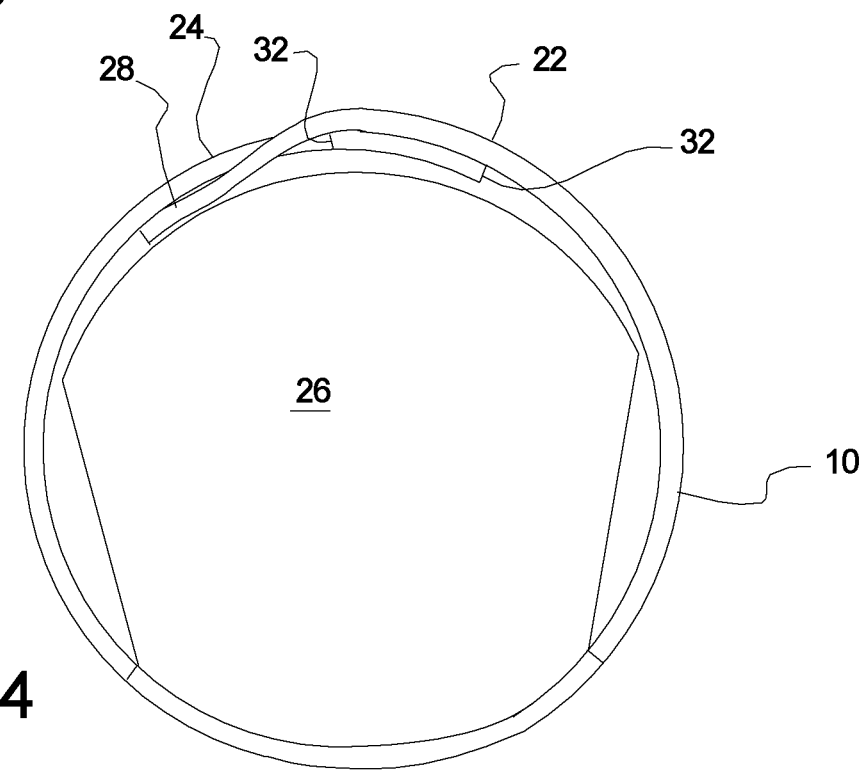
FIG. 4 is a view looking down at the disclosed invention prior to insertion into the downspout. The flexibility of the device would conform to the rectangular cross section commonly found in downspouts, when inserted into the downspout.

As shown in FIG. 2, the right tab 22 will have a hooked section 28 with an engagement slot 30. Additionally, the left tab 24 will having an engagement edge 32 that will cooperate with the hooked section 28 to retain the device in a rolled up arrangement as shown in FIG. 4, so that rolling the rectangular body about an axis 34 that is generally perpendicular to the lower edge 16 and around the closure tab 26 allows the engagement slot 36 of the right tab 22 to engage the rectangular body 12 at a location 38 that is immediately next to the left tab 24, so that the hooked section 28 of the right tab 22 cooperates with the engagement edge 32 of the left tab 24 to keep the device from unrolling, while at the same time securing the closure tab 26 between the right tab 2 and the left tab 24, within the rolled up rectangular body 12 as shown in FIGS. 1 and 4.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A device for temporarily plugging the inlet of a downspout, the device comprising:
    a rectangular body having a lower section having a lower edge, a pair of side edges that extend up from the lower edge, an upper section having a right tab, a left tab, and a closure tab that is positioned between the right tab and the left tab;
    the right tab having a hooked section including an engagement slot; and
    the left tab having an engagement edge, so that rolling the rectangular body about an axis that is generally perpendicular to the lower edge and around the closure tab allows the engagement slot of the right tab to engage the body at a location immediately next to the left tab, so that the hooked section of the right tab cooperates with the engagement edge of the left tab to keep the device from unrolling, while at the same time securing the closure tab within the rolled up rectangular body.

* * * * *